(12) United States Patent
Shannon et al.

(10) Patent No.: US 10,992,757 B2
(45) Date of Patent: Apr. 27, 2021

(54) EDGE-COMPUTING-BASED FORENSIC FEEDBACK ARCHITECTURE

(71) Applicant: Bank of America Corporation, Charlotte, NC (US)

(72) Inventors: Stephen T. Shannon, Charlotte, NC (US); William August Stahlhut, The Colony, TX (US)

(73) Assignee: Bank of America Corporation, Charlotte, NC (US)

( * ) Notice: Subject to any disclaimer, the term of this patent is extended or adjusted under 35 U.S.C. 154(b) by 29 days.

(21) Appl. No.: 16/446,740

(22) Filed: Jun. 20, 2019

(65) Prior Publication Data
US 2020/0404058 A1 Dec. 24, 2020

(51) Int. Cl.
*G06F 15/17* (2006.01)
*H04L 29/08* (2006.01)
*G06N 20/00* (2019.01)

(52) U.S. Cl.
CPC .......... *H04L 67/125* (2013.01); *G06N 20/00* (2019.01); *H04L 67/1059* (2013.01); *H04L 67/1068* (2013.01); *H04L 67/18* (2013.01); *H04L 67/22* (2013.01)

(58) Field of Classification Search
CPC ... H04L 67/22; H04L 67/125; H04L 67/1059; H04L 67/1068; H04L 67/18; G06N 20/00
USPC ....................................................... 709/224
See application file for complete search history.

(56) References Cited

U.S. PATENT DOCUMENTS

| | | | |
|---|---|---|---|
| 8,243,596 | B2 | 8/2012 | Fedders et al. |
| 8,244,874 | B1 | 8/2012 | Thireault |
| 9,900,725 | B2 | 2/2018 | Young et al. |
| 2011/0306304 | A1* | 12/2011 | Forutanpour ..... H04M 1/72572 455/67.11 |
| 2013/0208295 | A1* | 8/2013 | Bryant .................. G06F 11/008 358/1.14 |
| 2014/0314226 | A1* | 10/2014 | Ordille .................. H04M 3/523 379/266.01 |
| 2017/0331803 | A1* | 11/2017 | Parello .................... G06F 21/44 |

(Continued)

OTHER PUBLICATIONS

Xiao, "A Scheme for Robust Distributed Sensor Fusion Based on Average Consensus", 2005.*

(Continued)

*Primary Examiner* — Jeffrey R Swearingen
*Assistant Examiner* — Messeret F Gebre
(74) *Attorney, Agent, or Firm* — Weiss & Arons LLP; Michael A. Springs, Esq.

(57) ABSTRACT

Aspects of the disclosure relate to systems and methods for maintaining situational stability at a target location. The systems may include a database of machine-learning ("ML")-derived event profiles. The systems may include a plurality of edge-nodes that are proximal to the target location. Each edge-node may generate a data stream of situational data pertaining to the target location. Each edge-node may transmit its data stream to the other edge-nodes. Each edge-node may conglomerate its own data stream with the data streams received from the other edge-nodes to create a conglomerated data stream. Each edge-node may monitor its conglomerated data stream for data that matches one of the event profiles. When a consensus is determined among the edge-nodes that a match occurred, the systems may execute a pre-determined response.

12 Claims, 5 Drawing Sheets

(56) References Cited

U.S. PATENT DOCUMENTS

| | | | |
|---|---|---|---|
| 2018/0121891 A1 | 5/2018 | Hosny et al. | |
| 2018/0124206 A1* | 5/2018 | Sollacher | H04W 72/0406 |
| 2018/0157687 A1* | 6/2018 | Hanatani | G06F 16/283 |
| 2018/0167445 A1 | 6/2018 | Speight et al. | |
| 2018/0367314 A1 | 12/2018 | Egner et al. | |
| 2019/0026450 A1 | 1/2019 | Egner et al. | |
| 2019/0280447 A1* | 9/2019 | Nelson | H01S 3/0014 |

OTHER PUBLICATIONS

X. Wei et al., "MVR: An Architecture for Computation Offloading in Mobile Edge Computing," 2017 IEEE International Conference on Edge Computing (EDGE), Honolulu, HI, USA, 2017, pp. 232-235 (Year: 2017).*

Peng, K., Leung, V. C. M., Xu, X., Zheng, L., Wang, J., & Huang, Q. (2018). A survey on mobile edge computing: Focusing on service adoption and provision. Wireless Communications and Mobile Computing, 2018, 8267838 (16 pp.). (Year: 2018).*

N. Hassan, S. Gillani, E. Ahmed, I. Yaqoob and M. Imran, "The Role of Edge Computing in Internet of Things," in IEEE Communications Magazine, vol. 56, No. 11, pp. 110-115, Nov. 2018 (Year: 2018).*

W. Shi and S. Dustdar, "The Promise of Edge Computing," in Computer, vol. 49, No. 5, pp. 78-81, May 2016 (Year: 2016).*

Mary Shacklett, "Edge Computing: A Cheat Sheet," https://www.techrepublic.com/article/edge-computing-the-smart-persons-guide/, Jul. 21, 2017.

Paul Miller, "What is Edge Computing?" https://www.theverge.com/circuitbreaker/2018/5/7/17327584/edge-computing-cloud-google, May 7, 2018.

"What is Edge Computing," https://www.ge.com/digital/blog/what-edge-computing, GE Digital, Retrieved on May 16, 2019.

* cited by examiner

FIG. 5 ent profiles is detected, the method may include
executing a predetermined response to the one of the event
profiles. The predetermined response may be executed via
one or more of the digital devices.

EDGE-COMPUTING-BASED FORENSIC FEEDBACK ARCHITECTURE

FIELD OF TECHNOLOGY

Aspects of the disclosure relate to digital systems. Specifically, aspects of the disclosure relate to methods and apparatus for digital systems with real-time situational awareness and responsiveness.

BACKGROUND OF THE DISCLOSURE

Many entities operate digital networks. Digital networks may include multiple node devices. Each node device may receive, generate, and/or transmit data. The data may be associated with the network.

The data accumulated (e.g., via the nodes) in the network may include valuable situational information. The situational information may be useful for real-time awareness of conditions and events within the entity. Awareness of conditions and events may be critical for appropriately responding to the conditions and events.

Data may accumulate in the network on a very large scale. Massive data accumulation may yield a rich and inclusive dataset. However, accumulating so much data may make it difficult to isolate and pinpoint meaningful situational information within the data.

Furthermore, many digital networks cull data from a number of disparate devices. The heterogeneous nature of data received from multiple sources may create an additional challenge in identifying, much less responding to, meaningful situational information within the data.

It would be desirable, therefore, to provide systems and methods for real-time situational awareness and responsiveness within digital systems.

SUMMARY OF THE DISCLOSURE

Aspects of the disclosure relate to systems and methods for maintaining situational stability at a target location. The systems and methods may be operable at least in part via a set of digital devices at a network edge. The digital devices may be edge-nodes. Each digital device may include a processor, a memory, a sensor, and a communication element for communicating with other digital devices and/or a centralized server.

A method may include generating a database of event profiles. The generating may employ a machine-learning ("ML") engine. The method may include accessing the set of digital devices. The set of digital devices may be located within sensor range of the target location.

The method may include generating a data stream. The data stream may include situational data. The situational data may pertain to the target location. The situational data may be generated via the sensors of the digital devices.

The method may include transmitting the data streams. Transmitting the data streams may involve each digital device transmitting its own locally sourced data stream to some or all of the other digital devices in the set of digital devices.

The method may include each computing device conglomerating the data streams (its own and the ones received from the other devices) into a cohesive conglomerated data stream, and storing the conglomerated data stream.

The method may include each digital device independently monitoring its conglomerated data stream for one of the event profiles. When a consensus is determined that one

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Aspects of the disclosure relate to methods and apparatus for digital systems with real-time situational awareness and responsiveness. The digital systems may utilize edge-computing. The digital systems may include one or more edge-nodes.

Edge-computing as used herein refers to computing networks and environments that utilize elements, or nodes, at the logical edge of the network. The logical edge of a network may include portions of the network that are at, or close to, the interface with the environment outside of the network.

An edge-node may be a node on the periphery or edge of a network. An illustrative network may be an internet-of-things ("IoT") network. An IoT network may include one or more nodes. Each node may include two or more nodes.

A node may include, or may be, a sensor. A sensor may detect changes in attributes of a physical or virtual operating environment. For example, sensors may measure attributes such as audio, rainfall, movement, temperature, water levels, human activity, or activity of other sensors. Sensors may measure electronic network traffic, customer traffic, resource usage, electronic signals (e.g., input or output) or frequency of user logins within a predefined geographic area.

Nodes may be any suitable size. For example, nodes may be a few millimeters in size. Nodes may be deployed in a wide variety of locations. For example, sensors may be deployed in military battlefields, industrial plants, in orchards, in clothing, automobiles, smartphones, jewelry, refrigerators, institutions, or any other suitable location. Sensors may be relatively inexpensive and have low energy consumption. Sensors may "sense" two or more stimuli or environmental attributes.

Nodes may implement two or more functions. For example, sensors may measure changes in their operating (physical or virtual) environment, capture data corresponding to the measured changes and store/communicate the captured data. Sensors may be accessed by other sensors or other nodes on the network.

A node may include, or may be, an actuator. For example, based on data captured by a sensor, an actuator may respond to a detected event. Based on the capture and analysis of multiple sources of data (e.g., captured by sensors), an actuator may be instructed to take action autonomously, without human intervention.

Actuators may respond to data transmitted or processed by other nodes. Actuators may include devices that modify the physical state of a physical entity. Actuators may include devices that modify a virtual state of information. Actuators may move (translate, rotate, etc.) physical objects or activate/deactivate functionalities of physical objects.

For example, actuators may dim a light bulb, open a door, change a temperature setting, authorize access to an ATM and/or any other suitable functionality. Actuators may push notifications or redistribute resources. For example, notifications may route resources consumers (e.g., customers) to a location that has available resources to service the consumption.

Within an IoT environment, sensor nodes may perform the functions of input devices—they serve as "eyes" collecting information about their native operating environment. In contrast, actuator nodes may act as "hands" implementing decisions based on data captured by the sensor nodes. A single node may include the functions of sensors and actuators.

Nodes may include an application programming interface ("API") for communicating with other nodes. Nodes may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision-making and communication processes for actuators.

Nodes may store captured data locally. For example, nodes may store captured data in on-board transitory and/or non-transitory computer readable media. A node may transmit data. Data captured by a node may be transmitted to another node. A node may transmit data to a network core.

The network core may process the data. For example, multiple sensors may transmit captured data to a cloud computing environment. The cloud computing environment may itself include multiple nodes, such as computer servers or other computer systems. Nodes of the cloud computing environment may be networked to each other.

The cloud computing environment may process data that was captured by other nodes far from the location where the data was generated. For example, captured data may be transmitted from one node to another node until the captured data reaches a centrally located data repository.

Data captured by nodes in an operating environment may be voluminous and complex (e.g., structured/unstructured and/or constantly changing). Traditional data processing application software may be inadequate to meaningfully process the voluminous and complex data (e.g., "big data"). A cloud computing environment may include software applications specially designed to process large volumes of data ("big data analytics").

Nodes may communicate with other nodes directly, without transmitting information to an intermediary node or central server, such as a cloud computing environment. Data may be transmitted by a node using any suitable transmission method. For example, data captured by a node may be transmitted from a smartphone via a cellular network. Nodes may leverage a communication link provided by a smartphone to communicate captured data to other nodes.

As a result of the disparate nature of nodes, a networked operating environment may support a variety of communication protocols. Illustrative supported protocols may include HyperText Transfer Protocol ("HTTP"), Simple Object Access Protocol ("SOAP"), REpresentational State Transfer ("REST") Constrained Application Protocol ("CoAP"), SensorML, Institute of Electrical and Electronic Engineers ("IEEE") 802.15.4 ("ZigBee") based protocols, IEEE 802.11 based protocols. For example, ZigBee is particularly useful for low-power transmission and requires approximately 20 to 60 milli-watts ("mW") of power to provide 1 mW transmission power over a range of 10 to 100 meters and a data transmission rate of 250 kilo-bits/second.

To further conserve energy, a node may communicate wirelessly for short periods of time. Utilizing this approach, one or more standard size single cell dry battery batteries (e.g., AA size) may provide a node with requisite computing power and wireless communication for many months.

Communication protocols used by nodes may not have, or may not be capable of having, security capabilities. A security layer or buffer may be implemented by nodes that receive or rely on data captured by unsecured sensors. Nodes may be dynamically connected or disconnected from a group or consortium. A security layer or buffer may be modular and scalable meet network node growth/contraction requirements.

A physical layer may link nodes within a network. The physical layer may provide data ports and communication pathways to move data between multiple sub-networks and nodes. Such communication pathways may be wired or wireless. Exemplary wireless communication pathways may include Ethernet, Bluetooth, Wi-Fi, 3G, 4G, 5G and any other suitable wired or wireless broadband standards. Illustrative data ports of nodes may include hardware and/or software for receiving and/or transmitting data using any suitable communication pathway.

Each node may be assigned a unique identifier. For example, nodes may be identified by one or more radio frequency identification ("RFID") tags. The RFID tag may be stimulated to transmit identity information about the node or any other information stored on the RFID tag. Nodes may be identified by an Internet Protocol ("IP") address. Nodes may be identified based on a user. For example, a smartphone may be a node identified based on a user that successfully inputs biometric credentials.

Nodes may be positioned in, and capture data from, diverse operating environments. Operating environments may include geographic locations or virtual locations on electronic networks. Captured data may be transmitted to a location where information is needed for decisioning or consumption. Such a location may not be the same location where the data was captured or generated. Data synchronization protocols and caching techniques may be deployed across an IoT network to facilitate transmission of data, or delivery of data to, any desired node.

For example, a location where data is captured may not have continuous, reliable network connectivity. Accordingly, captured data may be stored locally on a node until a network connection is available to transmit or broadcast the captured data to another node.

Nodes may be grouped. Nodes may be grouped based on physical proximity or based on the content (or expected content) of data captured by the sensor. Nodes may be grouped based on detected movement of a node. For example, nodes may be affixed to vehicles or other moveable objects. Such nodes may move in or out of a network. Nodes within a geographic area may be grouped based on their presence within the geographic area. For example, nodes in and/or around a room, building, or institution, or a portion thereof, may form a group. Nodes may be grouped based on their expected trajectory. Nodes may be grouped based on whether they are resource consumer or providers. Nodes may be grouped based on expected resource consumption. Nodes may be grouped virtually. Grouped nodes may form a sub-network.

Contextually, data captured by nodes may provide information not only about the native (physical or virtual) operating environment surrounding a node, but data captured by multiple nodes may provide data that signifies occurrence an event. The data may be analyzed by a cloud computing environment. Analytical tools (e.g., big data analysis techniques) may detect, within the data, occurrence of an event that triggers actuator nodes to take responsive action.

Advances in embedded systems, such as System-on-a-Chip (SoC) architectures, have fueled development of nodes that are powerful enough themselves to run operating systems and complex data analysis algorithms. An illustrative SoC may include a central processing unit ("CPU"), a graphics processor ("GPU"), memory, power management circuits, and communication circuit. Within an operating environment, such nodes may be positioned closer (relative to the cloud computing environment) to other data gathering nodes such as sensors. Nodes positioned close to the source of generated data and having sufficient computational power to process the data may be termed "edge-nodes." Edge-nodes may integrate sensing capabilities, actuating capabilities, data connectivity and/or computing capacities.

Edge-nodes may control sensors, actuators, embedded devices and other nodes. Edge-nodes, or the nodes they control, may not be continuously connected to a network. Edge-nodes may provide computational resources positioned near the source of captured data or near an operating environment. Processing data using edge-nodes may reduce the communication bandwidth needed to transmit data from a node to a cloud computing environment.

For example, a sensor deployed in a windfarm turbine may detect changes in wind speed or wind direction. Typically, the sensor may transmit the detected changes to a remote cloud computing environment. The remote cloud computing environment may process data received from the node (and other nodes) and issue instructions to adjust a position of the turbine in response to the detected changes. However, communication with, and processing by, the cloud computing environment may inject additional latency before the turbines are adjusted in response to the sensed changes.

By running data analytics and processing closer to the originating source of data, actuator response times may be improved. Edge-nodes embedded in the turbine may include sufficient processing power to analyze sensed data and adjust turbines with less latency (perhaps even in close to real-time) and thereby optimize electricity production of the turbine.

In addition to providing faster response time to sensed changes, processing data using edge-nodes may reduce communication bandwidth requirements and improve overall data transfer time across a network. Furthermore, less frequent data transmissions may enhance security of data gathered by nodes. Frequent data transfers may expose more data to more potential security threats. For example, transmitted data may be vulnerable to being intercepted en-route to the cloud computing environment.

Additionally, edge-nodes may be tasked with decision-making capabilities. Edge-nodes may discard non-essential data generated by sensors. Such disregarded data may never be transmitted or stored in the cloud computing environment, further reducing exposure of such data to security threats.

For example, a network of security cameras (e.g., sensor nodes) may generate large amounts of video data. Transmitting such large amounts of data to a cloud computing environment may utilize significant bandwidth—possibly preventing the cloud computing environment from timely receiving other data. Edge-nodes may analyze the video data at the source, before transmitting the data to the cloud computing environment. The analysis by the edge-nodes may identify "important" video footage and discard the rest. Only the important video footage may be transmitted to the cloud computing environment, reducing network congestion.

Often, instructions to actuators need to be issued in milliseconds or faster. Round-trip communication to a cloud computing environment introduces undesirable latency. For some applications, necessary reliability and critical-path control management make it undesirable to wait for the cloud computing environment to process data and issue responsive instructions.

For example, an anti-collision algorithm for an autonomous vehicle may be executed by the cloud computing environment. However, it would be faster and more reliable for such anti-collision algorithms to be run by edge-nodes. Furthermore, the anti-collision data may have short-term value and it would therefore be undesirable to regularly transmit that data to the cloud computing environment.

Some nodes may be deployed in areas with poor network connectivity. For example, industries such as mining, oil/gas, chemicals and shipping may not be well served by robust communication infrastructure. Incorporating edge-nodes may allow networks associated with these industries to process data without robust communication infrastructure.

Smartphones may not have access to a data connection. Edge-nodes may allow a cached version of a website to be opened on a smartphone, without an internet connection. Data may be entered into the website and changes saved locally to the edge-node (e.g., the smartphone itself). The edge-node may sync changes with the cloud computing environment when a data connection is available. Aggregated sensor data may be transmitted to the cloud computing environment at designated times, such as when network bandwidth is underutilized.

Utilizing edge-nodes to process data may improve security of a network. For example, a network breach may be detected by an edge-node. The intrusion may be quarantined by or at the edge-node and prevent the breach from compromising the entire network.

Edge-nodes may run encryption algorithms and store biometric information locally. Such dispersion of security protocols may reduce the risk of any user's security information being comprised. Utilizing edge-nodes may disperse processing power needed to run the security or encryption algorithms.

Utilizing edge-nodes may improve reliability of a network. For example, edge-nodes with machine learning capabilities may detect operational degradation in nodes, equipment, and infrastructure deployed within an operating environment. Early detected degradation may be cured before developing into full-blown failures.

Generally, edge-nodes may include a processor circuit. The processor circuit may control overall operation of an edge-node and its associated components. A processor circuit may include hardware, such as one or more integrated circuits that form a chipset. The hardware may include digital or analog logic circuitry configured to perform any suitable (e.g., logical) computing operation.

An edge-node may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, computer executable instructions, electronic signatures of biometric features or any other suitable information or data structures. Components of a node may be linked by a system bus, wirelessly or by other suitable interconnections. Edge-node components may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable an edge-node to perform various functions. For example, the non-transitory memory may store software applications used by an edge-node, such as an operating system, application programs, and an associated database. Alternatively, some or all of computer executable instructions of an edge-node may be embodied in hardware or firmware components of the edge-node.

Software application programs, which may be used by an edge-node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

An edge-node may support establishing network connections to one or more remote nodes. Such remote nodes may be edge-nodes, sensors, actuators or other computing devices. Edge-nodes may be personal computers or servers. An edge-node may communicate with other nodes using a data port. The data port may include a network interface or adapter. The data port may include a communication circuit. An edge-node may include a modem, antenna or other communication circuitry for establishing communications over a network, such as the Internet. The communication circuit may include the network interface or adapter. The communication circuit may include the modem.

Via the data port and associated communication circuitry, an edge-node may access network connections and communication pathways external to the edge-node. Illustrative network connections may include a local area network ("LAN") and a wide area network ("WAN"), and may also include other networks. Illustrative communication pathways may include Wi-Fi, wired connections, Bluetooth, cellular networks, satellite links, radio waves, fiber optic or any other suitable medium for carrying signals.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Edge-nodes may include various other components, such as a display, battery, speaker, and antennas. Edge-nodes may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

An edge-node may include a display constructed using organic light emitting diode ("OLED") technology. OLED technology may enhance functionality of an edge-node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing edge-nodes that consume less power for their basic functionality and allow any residual available power to provide enhanced security and functionality. Illustrative devices that may be constructed using OLED technology are disclosed in commonly assigned U.S. Pat. No. 9,665,818, which is hereby incorporated by reference herein in its entirety.

An edge-node may be, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Edge-nodes may utilize computer-executable instructions, such as program modules, executed by a processor. Software applications may include multiple program modules. Generally, program modules include routines, programs, objects, components, data structures, etc. that perform particular tasks or implement particular abstract data types. An edge-node may be operational with distributed computing environments where tasks are performed by remote processing devices that are linked through a communications network. In a distributed computing environment, program modules may be located in both local and remote computer storage media including memory storage devices. Edge-nodes may interact with a network of remote servers hosted on the Internet to store, manage, and process data (e.g., a cloud computing environment).

An edge-node may receive and/or transmit data in real-time or at pre-defined intervals, such as once a day. The edge-node may filter data captured by one or more nodes. The edge-node may repackage or reformat captured data.

Edge-nodes may include a battery. The battery may be a power source for electronic components of the edge-node. For example, the battery may supply power to the display, the communication circuit and the processor circuit. In some embodiments, an edge-node may include a plurality of batteries. Edge-nodes may include solar panels that convert solar energy into electricity that power one or more components of an edge-node.

A method for maintaining situational stability at a target location is provided. The target location may, for example, be a room or a building. The target location may be residential, commercial, military, government, private, public, or any other suitable type of target location.

The method may include generating a database of event profiles. The generating may employ a machine-learning ("ML") engine. Generating the event profiles may be based at least in part on historical data of certain events. The certain events may include events that may destabilize the target location or a portion thereof. The certain events may be part of a predetermined list of events.

The method may be operable at least in part via a set of digital devices at a network edge. The digital devices may be edge-nodes. Each digital device may include a processor, a memory, a sensor, and a communication element for communicating with other digital devices and/or a centralized server. The set of digital devices may be located within sensor range of the target location. The method may include accessing the set of digital devices.

The method may include generating a data stream. The data stream may include situational data. The situational data may pertain to the target location. The situational data may be generated via the sensors of the digital devices.

The method may include transmitting the data streams. Transmitting the data streams may involve each digital device transmitting its own locally sourced data stream to some or all of the other digital devices in the set of digital devices.

The method may include each computing device conglomerating the data streams (its own and the ones received from the other devices) into a cohesive conglomerated data stream, and storing the conglomerated data stream.

The method may include each digital device independently monitoring its conglomerated data stream for one of the event profiles. The devices may be polled to ascertain whether there is a consensus that an event profile was determined. The devices may be polled at predetermined time windows. Alternatively, or additionally, when any device determines that an event profile occurred, a polling of the set of devices may be triggered. When a consensus is determined that one of the event profiles is detected, the method may include executing a predetermined response to the one of the event profiles. The predetermined response may be executed via one or more of the digital devices.

The consensus may, in some embodiments, be a majority consensus. A majority consensus may include a scenario in which at least a half of the digital devices determine that the event profile was detected.

In some embodiments, the devices may be assigned weightings in determining a consensus, i.e., in a set of devices, a device that is more likely to be accurate may be assigned a higher weight. For example, in a set of six devices that are polled to ascertain whether an ATM is broken, the ATM itself may be given the weight of two votes. This way, if two devices aside form the ATM determine that an event occurred, a majority consensus may be reached, whereas if the ATM had only a single vote, joining with two other devices would not provide a majority.

In some embodiments, the data in the system may be ephemeral. For example, data may be stored in the edge-nodes for a predetermined period of time (e.g., 1 minute, an hour, a day, or any other suitable amount of time). In certain embodiments, the data may only be ephemeral when no event profile was determined based on the data.

In some embodiments, at least one of the event profiles may include data associated with a pattern of activity. The pattern may indicate that an emergency situation occurred at the target location. The pattern may indicate that a piece of equipment in the target location is in a condition of reduced operability.

The piece of equipment may, for example, be an automated teller machine ("ATM"). Another exemplary piece of equipment may be a furniture item. Examples of furniture items may include a table, desk, carpet, light fixture, and a door.

In certain embodiments, the situational data may include: a number of people who use the piece of equipment; a period of time over which the piece of equipment was used; visual evidence of decay in the piece of equipment; and/or a threshold change in user interaction with the piece of equipment. A threshold change in user interaction may, in some embodiments, include a threshold increase and/or decrease in a size of a queue of users waiting to operate the piece of equipment. An increase in the queue may indicate that the equipment is operating slowly. A decrease in the queue may also indicate that the equipment is malfunctioning and users are avoiding it.

In some embodiments, the set of devices may include a specialized set of devices installed at the target location. The specialized set of devices may have been installed at the target location, and/or designed, at least in part, for detecting situational data.

In certain embodiments, the set of devices may include at least one privately-owned device. The privately-owned device may be configured to receive permission for the accessing from an owner, or other authority, of said privately-owned device. In certain embodiments, the conglomerated data stream may be deleted from the privately-owned device upon the device exiting the proximity of the target location.

The permission may, for example, be received in response to a message that is transmitted to the privately-owned device. The transmission may be triggered when the privately-owned device enters the sensor range of the target location.

In another example, the permission may be received, at least in part, in response to the owner opting-in to a default permission setting on the privately-owned device. The opting-in to the default permission may trigger the accessing when the privately-owned device enters the sensor range of the target location.

A system for maintaining situational stability at a target location is provided. The system may include a set of digital devices at a network edge. The set of digital devices may be located within sensor range of the target location. Each digital device may include a processor, a memory, a sensor, and a communication element for communicating with other digital devices and/or a centralized server. The system may also include a database of event profiles generated by a machine-learning ("ML") engine.

Each digital device may be configured to generate, via the sensors, a data stream. The data stream may include situational data that pertains to the target location. Each digital device may be configured to transmit its data stream (i.e., the data stream generated by its own sensors) to at least some of the other digital devices.

The processor of each of the plurality of digital devices may be configured to conglomerate its data stream with the data streams received from the other digital devices, to create a conglomerated data stream. Each of the plurality of digital devices may be configured to store a copy of the conglomerated data stream.

The processor of each of the plurality of digital devices may be further configured to independently monitor the conglomerated data stream for one of the event profiles. When a consensus is determined that one of the event profiles is detected, the system may be configured to execute, via one or more of the digital devices, a predetermined response to the detected event profile.

A computer-based method for invoking a situational response associated with a malfunction of a physical asset is provided. The invoking may be executed via a set of digital devices at a network edge.

The method may include generating a database of event profiles, each event profile may include data associated with a pattern of activity. The pattern may indicate that the asset is compromised.

The method may include accessing the set of digital devices. The digital devices may be edge-nodes. Each digital device may include a processor, a memory, a sensor, and a communication element for communicating with other digital devices and/or a centralized server. The set of digital devices is located within sensor range of the asset.

The method may include generating a data stream. The data stream may be generated via the sensors of each digital device. Each digital device may generate a data stream of its own. A data stream may include situational data that pertains to the asset.

The method may include each digital device transmitting its data stream to all the other digital devices. The method may include each digital device conglomerating its own data stream with the data streams received from the other digital devices to create a conglomerated data stream. Each digital device may store a copy of the conglomerated data stream.

The method may include each digital device monitoring its conglomerated data stream for one of the event profiles. When a consensus is determined that one of the event profiles has been detected, the method may include executing a predetermined response to the detected event profile. The execution may be performed via one or more of the digital devices.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

Figure 1:
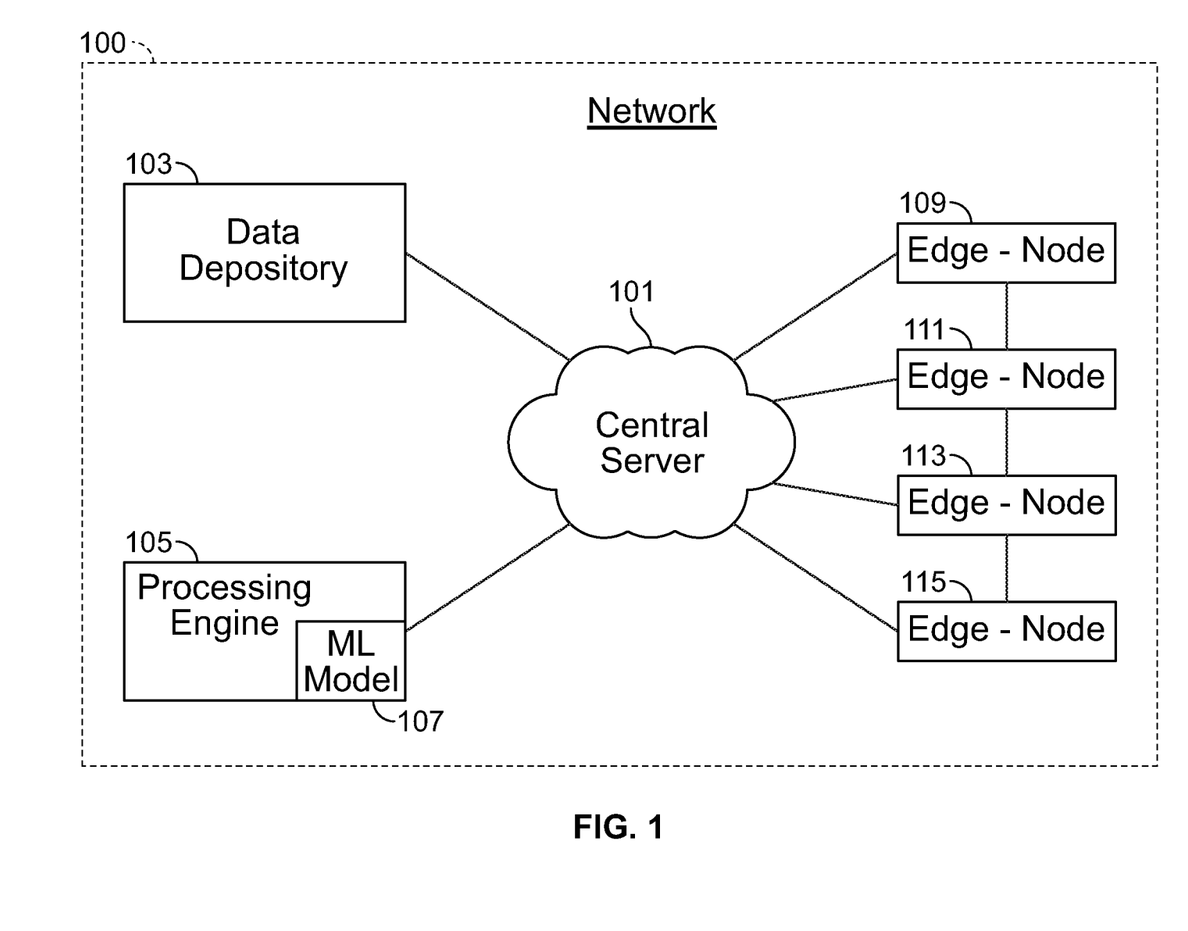
FIG. 1 shows an illustrative network architecture in accordance with principles of the disclosure.

FIG. 1 shows illustrative network architecture 100 according to aspects of the disclosure. Architecture 100 may include a central server 101. Central server 101 may be coupled with data depository 103. Central server 101 may be coupled with processing engine 105. Processing engine 105 may be operable with machine-learning ("ML") model 107.

Some or all of architecture elements 101-107 may be physically located in a central location. Some or all of architecture elements 101-107 may be logically centralized. Some or all of architecture elements 101-107 may be cloud-based.

Architecture 100 may include edge-nodes 109-115. Edge-nodes 109-115 may be devices at the network edge—i.e., devices at or near the interface with the environment outside of the network. Edge-nodes 109-115 may be devices that are capable of generating, processing, and storing data at the edge, without relying on central server 101. Each of edge-nodes 109-115 may include a sensor, a processor, and a memory.

Figure 2:
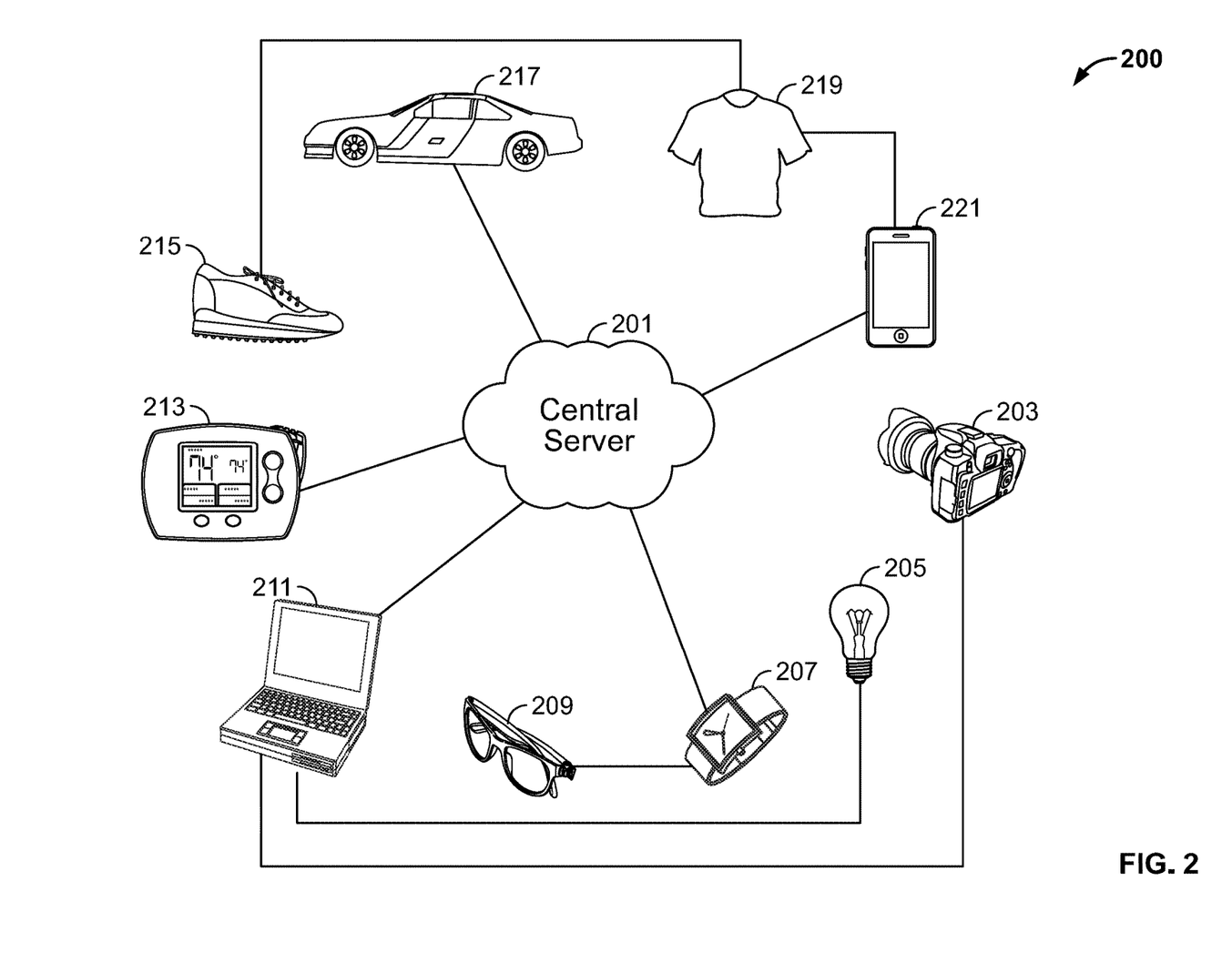
FIG. 2 shows another illustrative network architecture in accordance with principles of the disclosure.

FIG. 2 shows illustrative network architecture 200 according to aspects of the disclosure. Architecture 200 may include a central server 201. In some embodiments, architecture 200 may be a distributed network and may not include distinct central components.

Architecture 200 may include edge-nodes 203-221. Edge-nodes 203-221 may include a video camera, light bulb, smart watch, smart glasses, computer (e.g., laptop, desktop, tablet), smart thermostat, shoe, car, shirt, and smartphone, respectively. Each of edge-nodes 203-221 may include at least a sensor, a processor, and a memory. Each of edge-nodes 203-221 may be configured to communicate with other devices. Some of the nodes may communicate with the central server directly. Others may communicate with intermediate devices (intermediate devices may be referred to alternatively as edge servers) that may or may not then communicate with the central server. Architecture 200 shows connecting lines between edge-nodes 203-221 to show illustrative connective routes. For example, architecture 200 shows that while car 217 and computer 211 may be configured to communicate directly with central server 201, video camera 203 and light bulb 205 may be configured to communicate with the network via computer 211.

Figure 3:
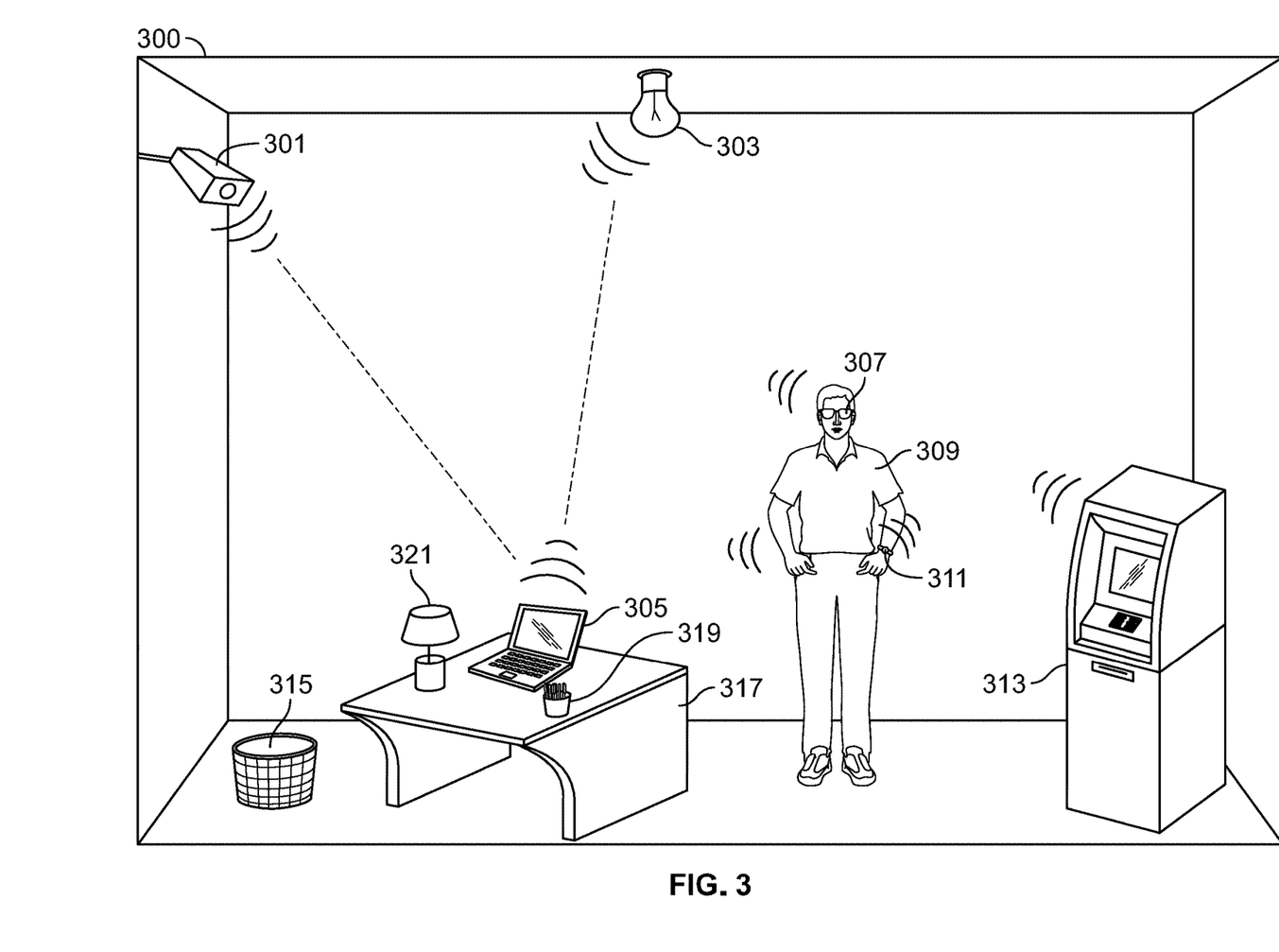
FIG. 3 shows an illustrative system architecture in accordance with principles of the disclosure.

FIG. 3 shows illustrative system architecture 300 in accordance with principles of the disclosure. System architecture 300 shows a network of edge-nodes that may be configured to provide situation awareness and response within an environment.

The network of edge-nodes within system architecture 300 may include video camera 301, light bulb 303, computer 305, smart glasses 307, smart clothing 309, smart watch 311, and ATM machine 313. Some of these edge-nodes, e.g., video camera 301 and light bulb 303, may have been installed at least in part for the purpose of maintaining situation stability in the environment. Other edge-nodes, e.g., 307-311, may be personal devices that join the network when they have authorized access and are proximal to the environment.

Wastebasket 315, desk 317, pen holder 319, and lamp 321 may be examples of items and equipment that are observed for situational stability. For example, the edge-nodes may sense a pattern of irregular darkness near lamp 321 and deduce that lamp 321 may require maintenance or repair. The edge-nodes may sense an irregularly lengthy, or irregularly short, queue of customers waiting for ATM 313, and deduce that ATM 313 is not operating at full capacity. The edge-nodes may sense an empty, or near empty, pen holder 317, and deduce that a refill is needed. The edge-nodes may confirm the deduction based on a consensus of multiple nodes. When confirmed, one or more of the nodes may take appropriate action, e.g., place an order for more pens, or transmit instructions to a repairperson to fix the ATM or lamp.

Figure 4:
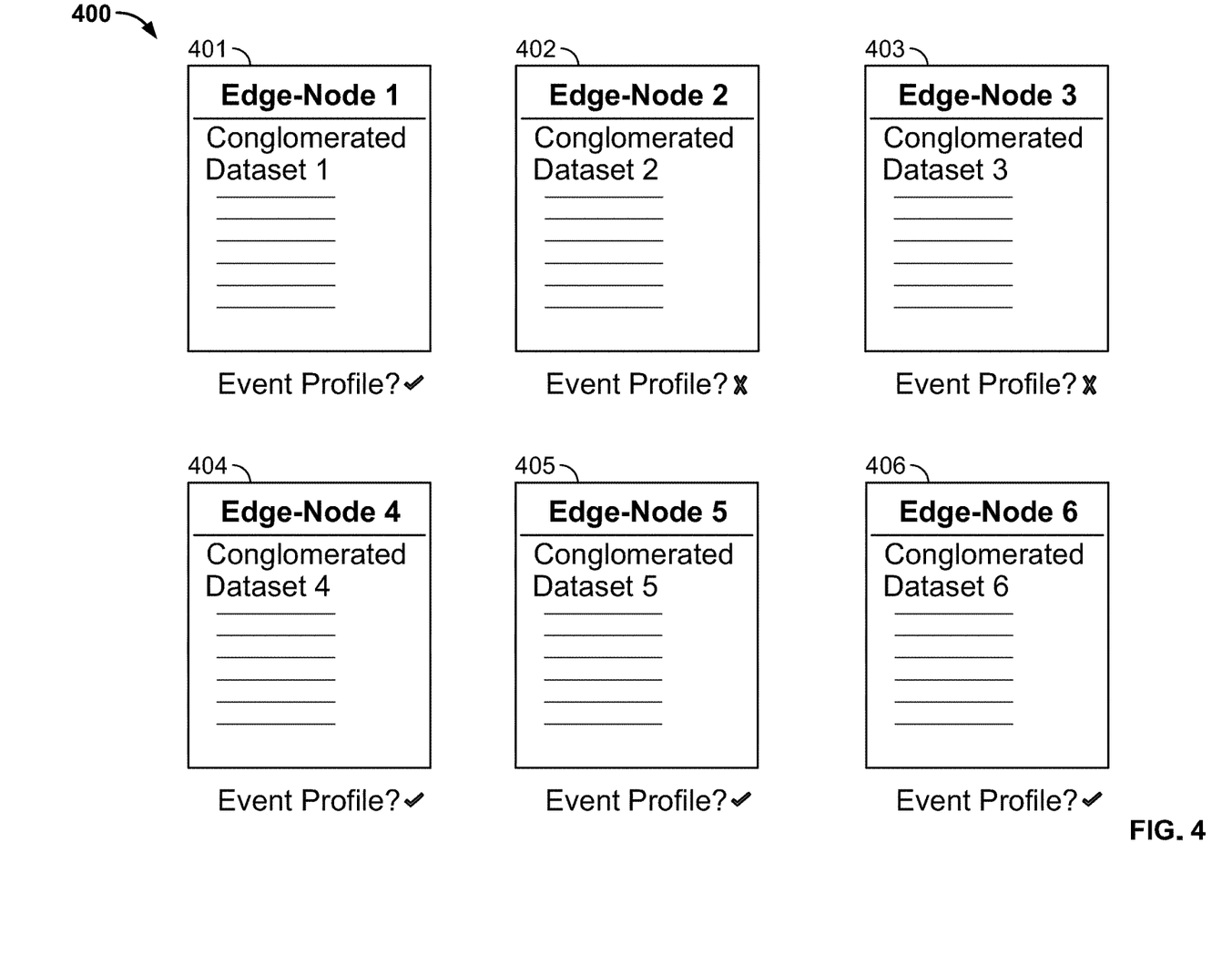
FIG. 4 shows an illustrative system in accordance with principles of the disclosure.

FIG. 4 shows illustrative system 400 in accordance with principles of the disclosure. System 400 shows edge-nodes 1-6 (401-406, respectively). Edge-nodes 1-6 contain conglomerated datasets 1-6, respectively. Base on the conglomerated dataset contained in each individual edge-node, the edge-node may monitor for an event profile. FIG. 4 shows that in system 400, edge-nodes 1 and 4-6 determined that an event profile was detected. Edge-nodes 2 and 3, on the other hand, determined that an event profile was not detected. The majority consensus is therefore that the event profile did occur. As such, system 400 may conclude that the event profile did occur, and may respond accordingly.

Figure 5:
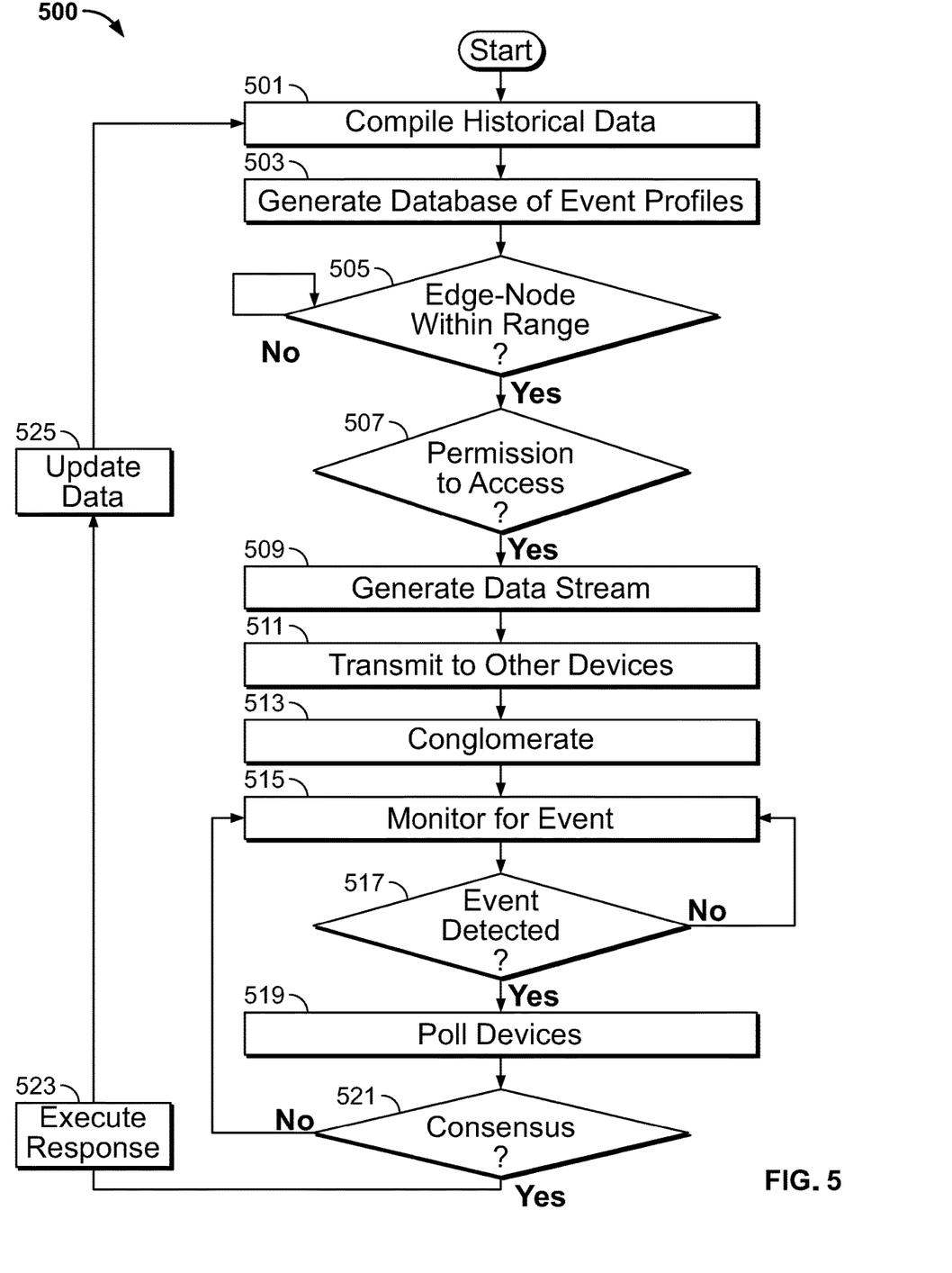
FIG. 5 shows an illustrative flowchart in accordance with principles of the disclosure.

FIG. 5 shows illustrative flowchart 500 of a logical flow according to aspects of the disclosure. Flowchart 500 may represent one exemplary embodiment—other embodiments may include different logical steps and/or step sequences than those shown in flowchart 500.

Flowchart 500 may begin with compiling historical data at step 501. The historical data may include data about events and emergencies that occurred in a certain environment/location. At step 503 the system may generate a database of event profiles. When an edge-node is within range of the environment (step 505: Yes), and the system has permission to access the edge-node (step 507: Yes), the edge-node may generate a data stream (step 509) via its sensors. The data stream may include information about events and/or conditions in the environment.

Step 511 may include transmitting the data stream to other edge-nodes in and/or near the environment. Step 513 may include conglomerating the data generated in the edge-node itself with data received from other edge-nodes. Step 515 may include monitoring the conglomerated data stream for an event. When an event is detected at 517, the system may poll multiple devices to confirm that the event occurred. When a consensus is determined at step 521, the system may execute an appropriate response at step 523. The system may also update the historical data based on the event which was just confirmed.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for edge-computing-based forensic feedback architectures are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for maintaining situational stability at a target location via a set of digital devices at a network edge, the method comprising:

generating, via a machine-learning ("ML") engine, a database of event profiles;

accessing the set of digital devices, wherein:

each digital device from the set of digital devices comprises a processor, a memory, a sensor, and a communication element for communicating with other digital devices and/or a centralized server; and the set of digital devices is located within sensor range of the target location;

generating, via the sensors of each digital device in the set of digital devices, a data stream comprising situational data that pertains to the target location;

transmitting, from each digital device in the set of digital devices to all the other digital devices in the set of digital devices, the data stream generated by said each digital device;

conglomerating, via the processor of each digital device in the set of digital devices, the data stream generated by the sensor of said each digital device with the data streams received from the other digital devices in the set of digital devices, to create a conglomerated data stream, and each digital device in the set of digital devices stores the conglomerated data stream;

monitoring the conglomerated data stream for one of the event profiles, said monitoring performed independently, via the processors of each digital device in the set of digital devices; and when a consensus is determined that one of the event profiles is detected, executing, via one or more of the digital devices, a predetermined response to the one of the event profiles;

wherein:

a first and a second of the event profiles comprise data associated with a pattern of activity, said pattern which indicates:

in the first event profile, that an emergency situation occurred at the target location; and in the second event profile, that a piece of equipment in the target location is in a condition of reduced operability, said second event profile that is configured to indicate the condition of reduced operability when the piece of equipment is an automated teller machine ("ATM") and a furniture item, said furniture item being a table, desk, carpet, light fixture, and a door;
the situational data includes:
a number of people who use the piece of equipment;
a period of time over which the piece of equipment was used;
visual evidence of decay in the piece of equipment; and
a threshold change in user interaction with the piece of equipment; and
the threshold change in user interaction comprises a threshold increase and decrease in a size of a queue of users waiting to operate the piece of equipment.

2. The method of claim 1, wherein the conglomerated data streams are ephemeral, wherein the method further comprises each device deleting its conglomerated data stream after a predetermined time period lapses without an event profile being detected.

3. The method of claim 1, wherein the set of devices comprises a specialized set of devices installed at the target location for detecting situational data.

4. The method of claim 1, wherein the set of devices comprises at least one privately-owned device, and the privately-owned device is configured to receive permission for the accessing from an owner of said privately-owned device, and the permission is received:
in response to a message that is transmitted to the privately-owned device, said transmission that is triggered when the privately-owned device enters the sensor range of the target location; or
in response, at least in part, to the owner opting-in to a default permission setting on the privately-owned device, wherein opting-in to the default permission triggers the accessing when the privately-owned device enters the sensor range of the target location.

5. The method of claim 1, wherein:
each device is assigned a weight in determining the consensus; and
the consensus is a majority consensus, said majority consensus comprising a scenario in which at least a half of the digital devices determine that the event profile was detected.

6. A system for maintaining situational stability at a target location, said system comprising:
a set of digital devices at a network edge, wherein:
each digital device from the set of digital devices comprises:
a processor;
a memory;
a sensor;
a communication element for communicating with other digital devices and/or a centralized server; and
a database of event profiles generated by a machine-learning ("ML") engine; and
the set of digital devices is located within sensor range of the target location;
wherein:
the sensors of each digital device in the set of digital devices are configured to generate a data stream comprising situational data that pertains to the target location;
each digital device in the set of digital devices is configured to transmit, to at least a plurality selected from the other digital devices in the set of digital devices, the data stream generated by said each digital device;
the processor of each of the plurality of digital devices is configured to conglomerate the data stream generated by the sensor of said each digital device with the data streams received from the other digital devices, to create a conglomerated data stream, and each of the plurality of digital devices is configured to store a copy of the conglomerated data stream;
the processor of each of the plurality of digital devices is configured to independently monitor the conglomerated data stream for one of the event profiles; and
when a consensus is determined that one of the event profiles is detected, the system is configured to execute, via one or more of the digital devices, a predetermined response to the one of the event profiles;
wherein:
a first and a second event profiles comprise data associated with a pattern of activity, said pattern which indicates:
in the first event profile, that a piece of equipment in the target location is in a condition of reduced operability, said piece of equipment comprising an automated teller machine ("ATM") and a furniture item; and
in the second event profile, that an emergency situation occurred at the target location,
the situational data includes:
a number of people who use the piece of equipment;
a period of time over which the piece of equipment was used;
visual evidence of decay in the piece of equipment; and
a threshold change in a user interaction with the piece of equipment and
the threshold change in user interaction comprises a threshold increase and decrease in a size of a queue of users waiting to operate the piece of equipment.

7. The system of claim 6, wherein the set of devices comprises a specialized set of devices installed at the target location for detecting situational data.

8. The system of claim 6, wherein the set of devices comprises at least one privately-owned device, and the privately-owned device is configured to receive permission for the accessing from an owner of said privately-owned device, and the permission is received:
in response to a message that is transmitted to the privately-owned device, said transmission that is triggered when the privately-owned device enters the sensor range of the target location; or
in response, at least in part, to the owner opting-in to a default permission setting on the privately-owned device, wherein opting-in to the default permission triggers the accessing when the privately-owned device enters the sensor range of the target location.

9. The system of claim 6, wherein the consensus is a majority consensus, said majority consensus comprising a scenario in which at least a half of the plurality of digital devices determine that the event profile was detected.

10. A computer-based method for invoking a situational response associated with a malfunction of a physical asset, said invoking being executed via a set of digital devices at a network edge, the method comprising:
generating a database of event profiles, each event profile comprising data associated with a pattern of activity, said pattern that indicates that the asset is compromised;
accessing the set of digital devices, wherein:
each digital device from the set of digital devices comprises a processor, a memory, a sensor, and a communication element for communicating with other digital devices and/or a centralized server; and the set of digital devices is located within sensor range of the asset;

generating, via the sensors of each digital device in the set of digital devices, a data stream comprising situational data that pertains to the asset;

transmitting, from each digital device in the set of digital devices to all the other digital devices in the set of digital devices, the data stream generated by said each digital device;

conglomerating, via the processor of each digital device in the set of digital devices, the data stream generated by the sensor of said each digital device with the data streams received from the other digital devices in the set of digital devices, to create a conglomerated data stream, and each digital device in the set of digital devices stores a copy of the conglomerated data stream;

monitoring the conglomerated data stream for one of the event profiles, said monitoring performed independently, via the processors of each digital device in the set of digital devices; and when a consensus is determined that one of the event profiles is detected, executing, via one or more of the digital devices, a predetermined response to the one of the event profiles;

wherein:

the asset comprises an automated teller machine ("ATM") and a furniture item, said furniture item being a table, desk, carpet, light fixture, and a door; and the situational data includes:

a number of people who use the asset;

a period of time over which the asset was used;

visual evidence of decay in the asset; and a threshold change in user interaction with the asset, said change in interaction comprising a threshold increase and decrease in a size of a queue of users waiting to operate the asset.

11. The method of claim 10, wherein the set of devices comprises a specialized set of devices installed proximal to the asset for detecting situational data.

12. The method of claim 10, wherein the set of devices comprises at least one privately-owned device, and the privately-owned device is configured to receive permission for the accessing from an owner of said privately-owned device, and the permission is received:

in response to a message that is transmitted to the privately-owned device, said transmission that is triggered when the privately-owned device enters within sensor range of the asset; or in response, at least in part, to the owner opting-in to a default permission setting on the privately-owned device, wherein opting-in to the default permission triggers the accessing when the privately-owned device enters the sensor range of the target location.

* * * * *